United States Patent
Achelpohl et al.

[11] Patent Number: 5,804,029
[45] Date of Patent: Sep. 8, 1998

[54] APPARATUS FOR ATTACHING LEAVES OF PLASTIC FILM MATERIAL TO LAID FLAT WORKPIECES

[75] Inventors: Fritz Achelpohl, Lienen; Richard Feldkamper; Andreas Kampschulte, both of Lengerich; Uwe Köhn, Osnabrück, all of Germany

[73] Assignee: Windmöller & Hölscher, Lengerich/Westf., Germany

[21] Appl. No.: 588,359

[22] Filed: Jan. 18, 1996

[30]    Foreign Application Priority Data

Jan. 25, 1995  [DE]  Germany .................. 195 02 255.6

[51] Int. Cl.[6] .................................. B65C 9/25; B65C 9/32
[52] U.S. Cl. .................... 156/497; 156/521; 156/539; 156/DIG. 36; 156/DIG. 51
[58] Field of Search .................................... 156/264, 359, 156/497, 521, 539, DIG. 2, DIG. 21, DIG. 23, DIG. 36, DIG. 43, DIG. 51; 493/191, 192, 194, 195, 196, 197, 218, 219

[56]            References Cited
         U.S. PATENT DOCUMENTS

| | | | |
|---|---|---|---|
| 3,080,910 | 3/1963 | Whitney, Jr. | 156/497 |
| 3,239,402 | 3/1966 | Ecklund et al. | 156/497 |
| 3,751,324 | 8/1973 | Enskat | 156/521 |
| 3,780,486 | 12/1973 | Jensen et al. | 156/350 |
| 3,951,050 | 4/1976 | Poole | 493/192 |
| 4,108,706 | 8/1978 | Brands et al. | 156/521 |
| 4,589,943 | 5/1986 | Kimball | 156/521 |
| 4,589,945 | 5/1986 | Polit | 156/497 |

*Primary Examiner*—Richard Crispino
*Attorney, Agent, or Firm*—Evenson, McKeown, Edwards & Lenahan, PLLC

[57]            ABSTRACT

An apparatus for attaching leaves of a film of a plastic material to laid flat workpieces made of a film of plastic material, consists of a frame with a plate or a table over which the workpieces are continuously conveyed by means of a conveyor device. In a gap of the table plate, there is arranged a pair of conveyor rollers mounted in the frame, and having a roller gap substantially aligned with the table surface; the bottom roller of the pair is a counterpressure roller and the top roller is a suction cylinder. A conveyor cylinder cooperating with the suction cylinder successively delivers the leaves to the suction cylinder. A fishtail nozzle directed towards the roller gap blows heated air into the roller gap in a controlled manner so as to weld the leaf to the workpiece. The suction roller prevents the conveyor cylinder from being heated by the hot air in an inadmissible manner.

8 Claims, 2 Drawing Sheets

APPARATUS FOR ATTACHING LEAVES OF PLASTIC FILM MATERIAL TO LAID FLAT WORKPIECES

FIELD OF THE INVENTION

The invention relates to an apparatus for attaching leaves of a film of plastic material to laid flat workpieces made of a plastic material, preferably these may be ventilating leaves on the opened out bottom squares, or bottom cover sheets on the closed bottoms, of cross bottom ventilated sacks.

PRIOR ART

It is known for ventilation leaves or bottom cover sheets made of a film of plastic material to be bonded, by means of a hot melt, to the opened out or closed bottoms of cross bottom ventilated sacks made of a plastic material. Such apparatuses are distinguished by a high output, but are relatively expensive, in particular because of the devices for the feeding of the hot melt and its application formatwise.

OBJECT OF THE INVENTION

It is therefore the object of the invention to create an apparatus of the kind mentioned at the outset that is simple in design and can therefore be inexpensively manufactured, whereby the leaves can be applied to the workpieces in their correct position, and be bonded thereto.

SUMMARY OF THE INVENTION

In accordance with the invention, there is provided an apparatus for attaching leaves to laid flat workpieces, comprising:

- a frame with a plate over which the tubular sections or workpieces are continuously fed by means of a conveyor device;
- a pair of conveyor rollers, arranged in a gap of the plate and mounted in the frame, defining a roller gap substantially aligned with the surface of the plate, whose bottom roller is a counterpressure roller, and whose top roller is a suction cylinder;
- a conveyor cylinder cooperating with the suction cylinder, for successively delivering the leaves to the suction cylinder; and
- a fishtail nozzle directed towards the roller gap for blowing heated air into the roller gap in a controlled manner.

In the apparatus in accordance with the invention, the workpieces, for example the tubular sections in the case of manufacture of sacks with cross bottoms, are thus conveyed with opened out and closed bottoms continuously over a plate or a table supporting them, during which conveying they slide over the table. If leaves or bottom sheets are to be applied to both opened out or closed bottoms at the same time, the successive conveyance of the workpieces is effected transversely. A gap in the table is provided with a pair of conveyor rollers whose roller gap is substantially aligned with the surface of the table, so that the workpieces can readily enter this roller gap. Out of the pair of conveyance rollers, the bottom roller is designed as a counterpressure roller, while the upper roller is a suction cylinder. This suction cylinder, provided for example in its cylindrical surface at equal angular intervals with suction air bores, cooperates with a conveyance cylinder which delivers the leaves successively to the suction cylinder. Thus this suction cylinder can be considered as "ironing" the leaf in the roller gap onto the workpieces moving therethrough. To ensure that the leaf is bonded to the workpiece, a fishtail nozzle is directed towards the roller gap and blows heated air into the roller gap in a controlled manner. In this process, the air has such a high temperature that the surfaces of the leaf and of the workpiece are plasticized to the point of tackiness, so that the leaf is pressed onto the workpiece in the roller gap of the pair of conveyance rollers and so that thereby a good bonding of the leaf on the workpiece is effected. The feeding of the leaves is adjusted to the passing of the workpieces in such a way that the leaves are bonded to the workpieces in their correct position. In this process, the feeding of the hot air is controlled in such a way that substantially only the zones to be bonded together are plasticized, or start to melt, in the required way. In this arrangement, the passing speed of the respective workpiece and of the leaf is chosen in such a way that a good bonding of both parts is effected. Since the hot air effecting the bonding is blown into the roller gap, it is not possible to exclude the possibility that the suction cylinder would in time heat up. However this heating is basically not detrimental, since the suction cylinder does not have any mechanical parts, for example gripper devices, which could, in time, become incapable of use by being smeared with a build-up of plasticized synthetic material. If required, the suction roller may also be additionally provided with a cooling device. In any case, the suction roller prevents the conveyance cylinder from being heated by the hot air in an inadmissible way which could impair its operating potential.

The adherence, of the leaf to be bonded, on the upper cylinder of the pair of conveyor rollers could also be obtained if the upper roller is a statically loaded cylinder instead of a suction cylinder.

The conveyor cylinder delivering the leaves to the suction cylinder is expediently a cutter cylinder whose cutter separates the leaves from a continuously or intermittently fed web of a plastic material. For holding the leaf on the conveyor cylinder, the conveyor cylinder may be surrounded over a part of its circumference by one side of an endless belt or a group of endless belts which press the leaf to be delivered, against the circumference of the conveyor cylinder.

The conveyor cylinder may, for the purpose of holding the leaf thereon, also be provided with grippers.

A cooling plate is expediently arranged above the table plate, in which arrangement the workpieces are fed through the gap between the cooling plate and the table plate to the roller gap. This cooling plate, which may be provided with ducts traversed by a cooling medium, prevents the table and other parts of the apparatus from being heated by the hot air blown in through the roller gap to such an extent that the workpieces of plastic material would become tacky and could cling to the table plate or other parts of the apparatus.

In a further development of the invention, a valve is arranged in the feeder line to the fishtail nozzle and is provided with a control device for the controlled blowing of the hot air into the roller gap. The valve may, for example, consist of a rotary slide which is displaced by a fluid pressure-operated ram (piston-cylinder unit) for its actuation.

To set the fishtail nozzle in an optimum way to the roller gap, the fishtail nozzle may be displaceable to and fro in the direction towards the roller gap by means of a control device. In this arrangement, the fishtail nozzle may be retractable to such an extent that it is completely removed from the zone of the roller gap.

BRIEF DESCRIPTION OF THE DRAWINGS

An example of the invention will be described below in greater detail with reference to the drawings, in which.

DETAILED DESCRIPTION OF PREFERRED EMBODIMENTS

Figure 1:
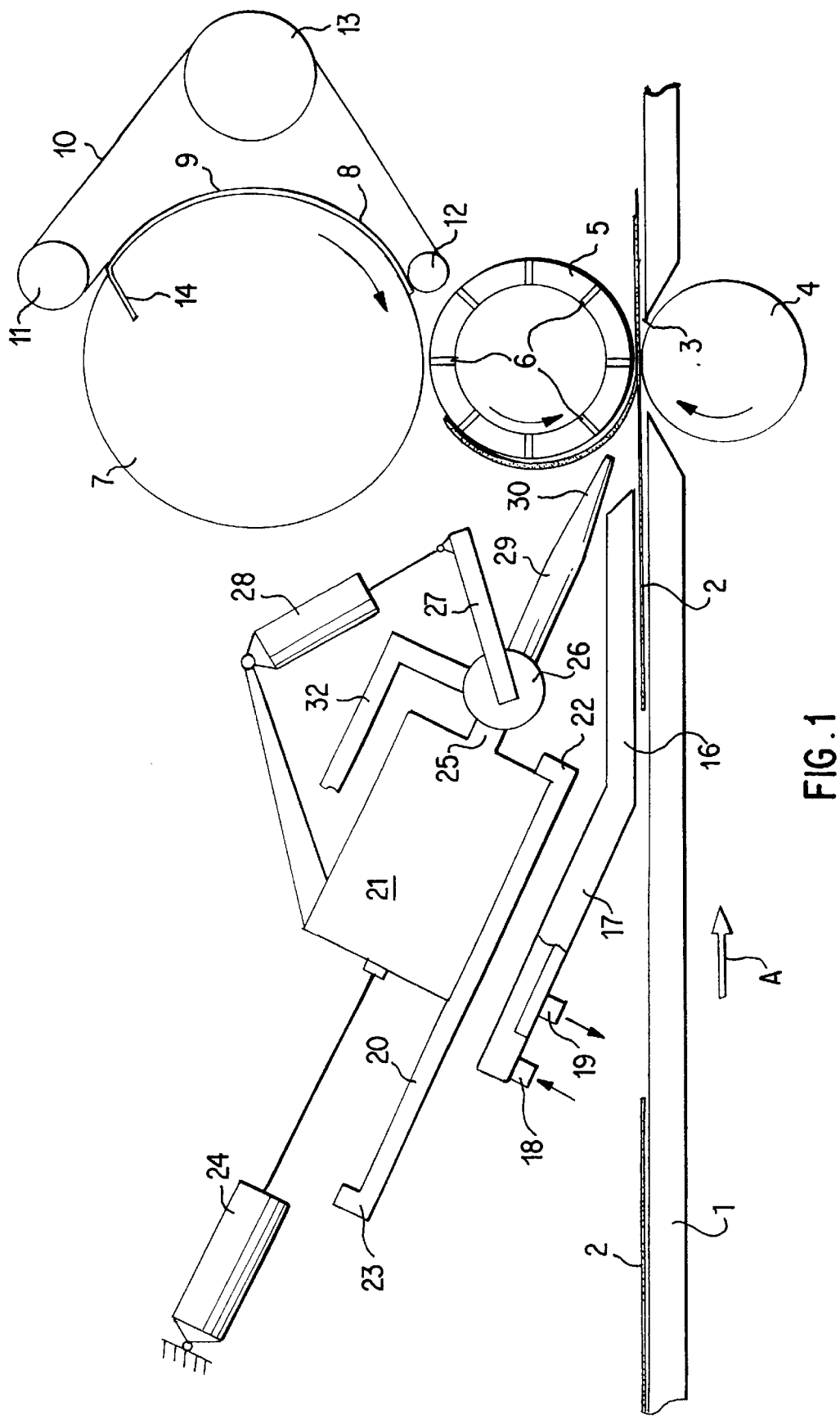
FIG. 1 is a side view of the apparatus for the application and sticking of leaves to workpieces in a schematic representation.

In a frame, not shown, there is mounted a table plate 1 whereon laid flat tubular portions of a plastic material with opened out or closed bottoms are continuously conveyed by conveyor devices, not shown, in the direction of arrow A. In the tubular portions 2, conveyed with a mutual interspacing with respect to each other, the closed bottoms or the opened out bottoms are folded into the plane of the laid flat tubular portions in the way shown in FIGS. 2 and 3. A counterpressure roller 4 and a suction roller 5 are mounted in the machine frame in a transverse gap 3 of the table 1, which rollers 4 and 5 together form a pair of conveyor rollers whose roller gap lies in the zone of the plane of the top of the table 1. The suction cylinder 5 is provided in its cylindrical surface shell, at approximately equal angular intervals, with rows of suction air holes 6. The suction air is fed towards the inside of the suction cylinder 5 in the known way by means of a rotary leadthrough, not shown.

A cutter and conveyor cylinder 7 is mounted in the machine frame, above the suction cylinder 5. The leaves 8, separated from an endless web of plastic material, not shown, are pressed against the cylinder 7 by a side 9 of a group of endless belts 10 which circulate over guide rollers 11, 12, 13 mounted in the machine frame. The roller 13 can also be driven by means of the belts 10. The cutter and conveyor cylinder 7 is provided with a cutter 14, extending along a generator in the usual way.

A cooling plate 16, which ends ahead of the roller gap of the cylinder pair 4, 5, is provided with an intake side 17 that is bent upwardly. The cooling plate 16, 17 is provided with cooling medium tubes, arranged in a meandering and/or snake-shaped configuration, which tubes are traversed by a cooling medium. This cooling medium, for example water, is introduced by a hose, not shown, into the connector pipes 18 and is drawn off again from the draining connector pipes 19. An oblique guide 20, mounted in the machine frame above the cooling plates 16, 17, carries a heating unit 21 which is displaceable to-and-fro between stops 22, 23 of the guide 20 by means of a fluid pressure-operated ram (piston-cylinder unit) 24. At its front end, the heating unit is provided with a pipe 25 for blowing out hot air. A rotary slide 26, arranged in the pipe 25, can be brought by an actuating lever 27 into an open and a closed position, as well as intermediate positions. For actuating the lever 27, there is provided a fluid pressure-operated ram (piston-cylinder unit) 28 which is articulated on one side to the hot air unit 21, and on the other side to the actuating lever 27. One output of the rotary slide 26 leads to a pipe 29 which carries a fishtail nozzle 30 directed into the gap between the rollers 4, 5. The other outlet of the rotary slide 26 leads into a pipe 32 which leads to the outside for venting hot air.

The suction cylinder 5 takes over the leaves 8 from the cutter and conveyor cylinder 7 in the way shown, and deposits them in the correct position on the passing sack workpieces. Meanwhile hot air is blown, at controlled times, through the fishtail nozzle 30 and into the roller gap wherein the leaves 8 and the workpiece 2 are located. This hot air plasticizes the plastic material or starts melting it in such a way that the leaves 8 bond to the workpieces 2.

The hot air supply is controlled in a timed sequence via the fluid pressure-operated ram 28 by a control device. The distance of the fishtail nozzle 30 from the roller pair can, moreover, be adjusted by means of the fluid pressure-operated ram 24, in the way desired.

Figure 2:
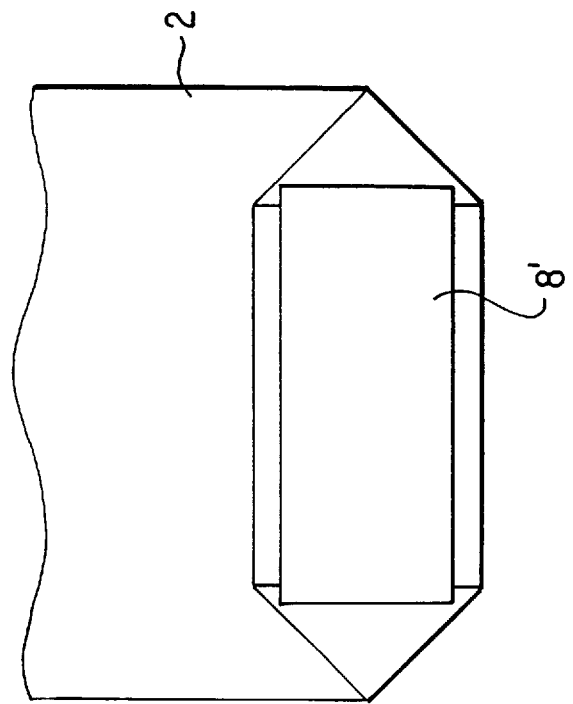
FIG. 2 is a top view of a closed cross bottom of a workpiece with a bonded bottom cover sheet.

FIG. 2 shows a workpiece consisting of a closed cross bottom whereon there has been bonded a bottom leaf 8'.

Figure 3:
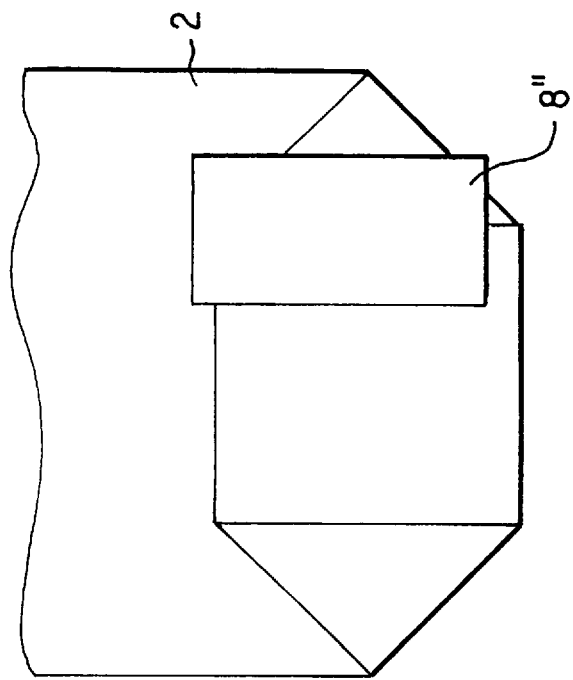
FIG. 3 is an opened-out bottom of a workpiece with a ventilation leaf bonded to a corner fold.

FIG. 3 shows a sack workpiece 2 with bottoms that are still open, wherein the ventilating leaf 8" is bonded to the leading corner fold of one bottom, to produce a ventilating hose in the known way as the side folds are folded in.

if it is intended to provide both bottoms formed on the tubular section 2 with bottom cover sheets 8' at the same time, the apparatus shown in FIG. 1 can be provided in a double configuration on both sides of the table 1.

We claim:

1. An apparatus for attaching leaves to laid flat workpieces, comprising:

a frame with a table plate including a transverse gap defined therein;

a conveyor device for continuously feeding laid flat workpieces over said table plate;

a suction cylinder and a counterpressure roller disposed below said suction cylinder, said suction cylinder and said counterpressure roller defining a roller gap which is aligned with said transverse gap and substantially aligned with a surface of the table plate;

a delivery cylinder for successively delivering the leaves to the suction cylinder;

a fishtail nozzle directed towards the roller gap and effective for discharging heated air into the roller gap in a controlled manner;

a displaceable heating unit for supplying the heated air to the fishtail nozzle; and means for modifying a flow of said heated air from said heating unit through the fishtail nozzle so that the heated air is discharged in said controlled manner.

2. An apparatus according to claim 1, wherein the delivery cylinder is a cutter cylinder whose cutter separates the leaves from a web of a plastic material that is continuously or intermittently fed.

3. An apparatus according to claim 1, wherein the delivery cylinder is surrounded over a part of its circumference by an endless belt for pressing the leaves against the delivery cylinder.

4. An apparatus according to claim 1, wherein the suction cylinder is provided with suction air holes for holding the leaves.

5. An apparatus according to claim 1, and further comprising a cooling plate arranged above the table plate, wherein the workpieces are fed to the roller gap between the cooling plate and the table plate.

6. An apparatus according to claim 1, wherein the means for modifying the flow of the heated air includes a valve arranged in a supply line between the heating unit and the fishtail nozzle and a control device for controlling heated air discharge into the roller gap.

7. An apparatus according to claim 1, and further comprising a unit for displacing the fishtail nozzle towards and away from the roller gap.

8. An apparatus according to claim 1, and further comprising a guide inclined with respect to said table plate and a unit for displacing said heating unit along a surface of said guide.

* * * * *